(12) United States Patent
Puchhammer (10) Patent No.: US 9,863,480 B2
(45) Date of Patent: Jan. 9, 2018

(54) WOBBLE MECHANISM

(71) Applicant: Gregor Puchhammer, Vienna (AT)

(72) Inventor: Gregor Puchhammer, Vienna (AT)

( * ) Notice: Subject to any disclaimer, the term of this patent is extended or adjusted under 35 U.S.C. 154(b) by 0 days.

(21) Appl. No.: 14/764,217

(22) PCT Filed: Jan. 30, 2014

(86) PCT No.: PCT/EP2014/000255
§ 371 (c)(1),
(2) Date: Jul. 29, 2015

(87) PCT Pub. No.: WO2014/117941
PCT Pub. Date: Aug. 7, 2014

(65) Prior Publication Data
US 2015/0369295 A1    Dec. 24, 2015

(30) Foreign Application Priority Data
Jan. 30, 2013 (AT) .................... A 63/2013

(51) Int. Cl.
| F16H 23/00 | (2006.01) |
| F16D 3/02 | (2006.01) |
| F16H 1/32 | (2006.01) |
| H02K 49/10 | (2006.01) |
| F16D 3/30 | (2006.01) |

(52) U.S. Cl.
CPC .............. *F16D 3/02* (2013.01); *F16D 3/30* (2013.01); *F16H 1/321* (2013.01); *H02K 49/102* (2013.01); *Y10T 464/30* (2015.01)

(58) Field of Classification Search
CPC .. F16D 3/02; F16D 3/30; F16H 1/321; H02K 49/102; H02K 49/104; H02K 49/106; Y10T 464/30
USPC ........... 464/29; 74/60; 475/163; 310/82, 103
See application file for complete search history.

(56) References Cited

U.S. PATENT DOCUMENTS

| 1,330,393 A * | 2/1920 | Rae ........................ F16H 23/04 |
| | | 475/163 X |
| 1,495,784 A * | 5/1924 | Fereday ................. H02K 41/06 |
| | | 310/82 |
| 3,540,307 A | 11/1970 | Schell |
| 2011/0237381 A1* | 9/2011 | Puchhammer .......... F16H 1/321 |
| | | 475/163 |

FOREIGN PATENT DOCUMENTS

| AT | 508205 A1 | 11/2010 |
| DE | 2249068 | 4/1974 |
| DE | 10028964 A1 | 1/2002 |
| DE | 102005001835 A1 | 7/2006 |
| EP | 0048593 A1 | 3/1982 |

* cited by examiner

*Primary Examiner* — Gregory J Binda
(74) *Attorney, Agent, or Firm* — Whitham, Curtis & Cook, P.C.

(57) ABSTRACT

A wobble mechanism having a wobble body is arranged on an input shaft. Magnets are arranged on the outer side of said wobble body, which interact with magnets which are arranged in a housing for transmitting torque to an output shaft. The wobble mechanism is connected to the output shaft via an angle joint.

15 Claims, 10 Drawing Sheets

WOBBLE MECHANISM

FIELD OF THE INVENTION

The invention relates to a wobble mechanism having a wobble body which is arranged on an input shaft and on the outer side of which magnets are arranged which interact with magnets which are arranged in a housing in order to transmit the torque to an output shaft.

BACKGROUND OF THE INVENTION

Wobble mechanisms of this type are disclosed and described, for example, in AT 508205 B1. The known mechanisms operate extremely quietly and also otherwise have substantial advantages over wobble mechanisms with crown gears.

SUMMARY OF THE INVENTION

The aim of the invention is to provide a wobble mechanism of the type mentioned at the outset which has further substantial advantages.

This is achieved by way of a wobble mechanism having the features of the main claim. Advantageous developments of the invention are disclosed in the subclaims, the description and the figures.

As a result of the measure according to the invention, one magnet mechanism stage can be saved in comparison with the known wobble mechanisms, in which, if one mechanism stage is not configured with toothing systems, at least three magnet mechanism stages are required. The transmission of the torque also becomes more rigid in comparison with the known wobble mechanisms with magnets.

In one embodiment of the invention, the angle joint can be a cardan joint or a magnetic coupling. Another embodiment of the invention is distinguished by the fact that the angle joint is a constant velocity joint.

In order to achieve a variable angle offset between the input shaft and the output shaft within the context of the invention, the output shaft can be pivoted with respect to the housing which is provided with the magnets.

To this end, the output shaft is expediently mounted in a pivoting housing which can be pivoted with respect to the housing which is provided with the magnets.

In the following text, the invention is described in greater detail using exemplary embodiments which are shown in the drawings, without being restricted to said examples.

BRIEF DESCRIPTION OF THE DRAWINGS

In the drawings:

FIG. 14 shows a further variant of FIG. 10, FIGS. 15A and B shows variants of the magnet arrangement.

DETAILED DESCRIPTION OF THE INVENTION

Figure 1:
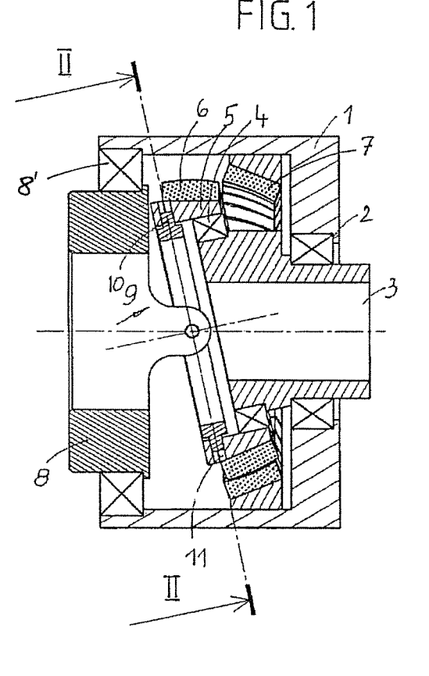
FIG. 1 shows a longitudinal section through a wobble mechanism according to the invention with a cardan joint.

According to FIG. 1, an input shaft 3 is mounted in a housing 1 by means of a bearing 2. The input shaft 3 supports a wobble body 5 via bearings 4, which wobble body 5 is fitted with magnets 6 on its outer circumference.

Magnets 7 are arranged displaceably in the housing 1, which magnets 7 interact, during the circulation of the wobble body 5 and the magnets 6, with the latter.

An output shaft 8 which is mounted via bearings 8' in the housing 1 is connected via a cardan joint 9 to the wobble body 5. The cardan joint 9 has shaft stubs 10 which engage into bores 11 of the wobble body 5.

Figure 2:
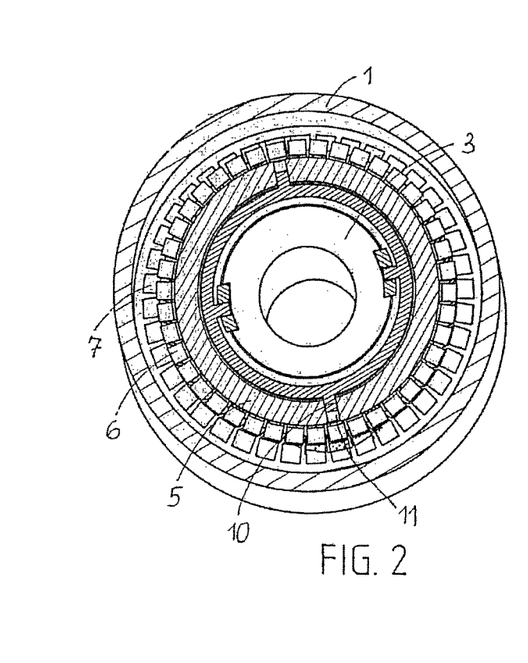
FIG. 2 shows a section along II-II in FIG. 1.
Figure 3:
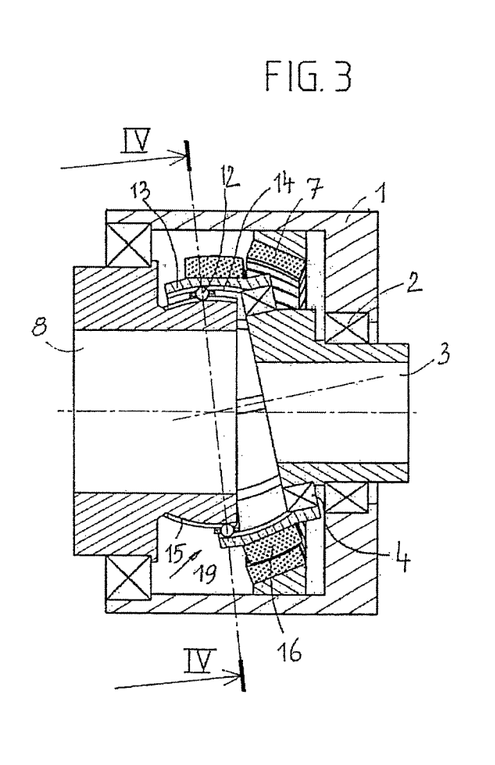
FIG. 3 shows a longitudinal section through a wobble mechanism according to the invention with a constant velocity joint.
Figure 4:
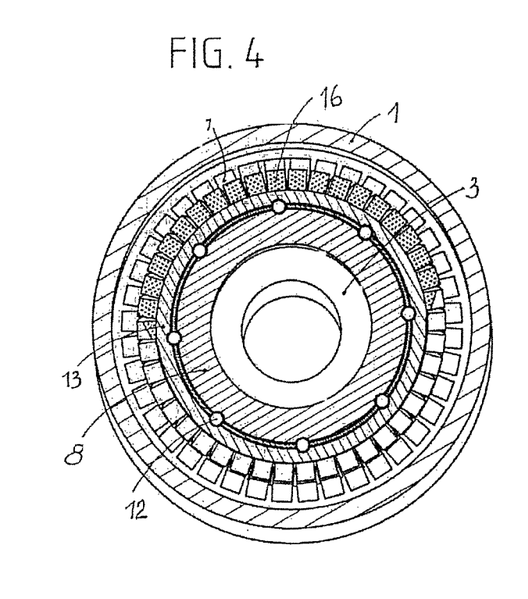
FIG. 4 shows a section along IV-IV in FIG. 3.

In one embodiment according to FIGS. 3 and 4, as in the exemplary embodiment according to FIGS. 1 and 2, an input shaft 3 is mounted in a housing 1 by means of a bearing 2. Via the bearing 4, the input shaft 3 supports a wobble body 13 which is configured as an outer shell for rolling bodies 12, the rolling bodies 12 being movable in raceways 14 of the arcuate wobble body 13.

Arcuate raceways 15 are arranged on the output shaft 8 with the bearing 8', which arcuate raceways 15 interact with the raceways 14 and the rolling bodies 12 which are movable therein. As a result, a constant velocity joint 19 is formed which connects the wobble body 13 to the output shaft 8.

Magnets 16 are arranged on the outer circumference of the shell-shaped wobble body 13. As in the exemplary embodiment according to FIGS. 1 and 2, magnets 7 are mounted displaceably in the housing 1. Said magnets 7 interact with the magnets 16 in the wobble body 13.

In both exemplary embodiments, in the case of a rotation of the input shaft 3, the wobble body 5, 13 is moved and transmits the torque via the magnets 6 or 16, 17 to the output shaft 8. This preferably takes place via an angle joint.

It can be seen that only two annular magnets are required for the transmission of the torque from the input shaft 3 to the output shaft 8. In the known wobble mechanism according to AT 508205 B1, either crown gears or three annular magnets were necessary.

Figures 5, 6, 7:
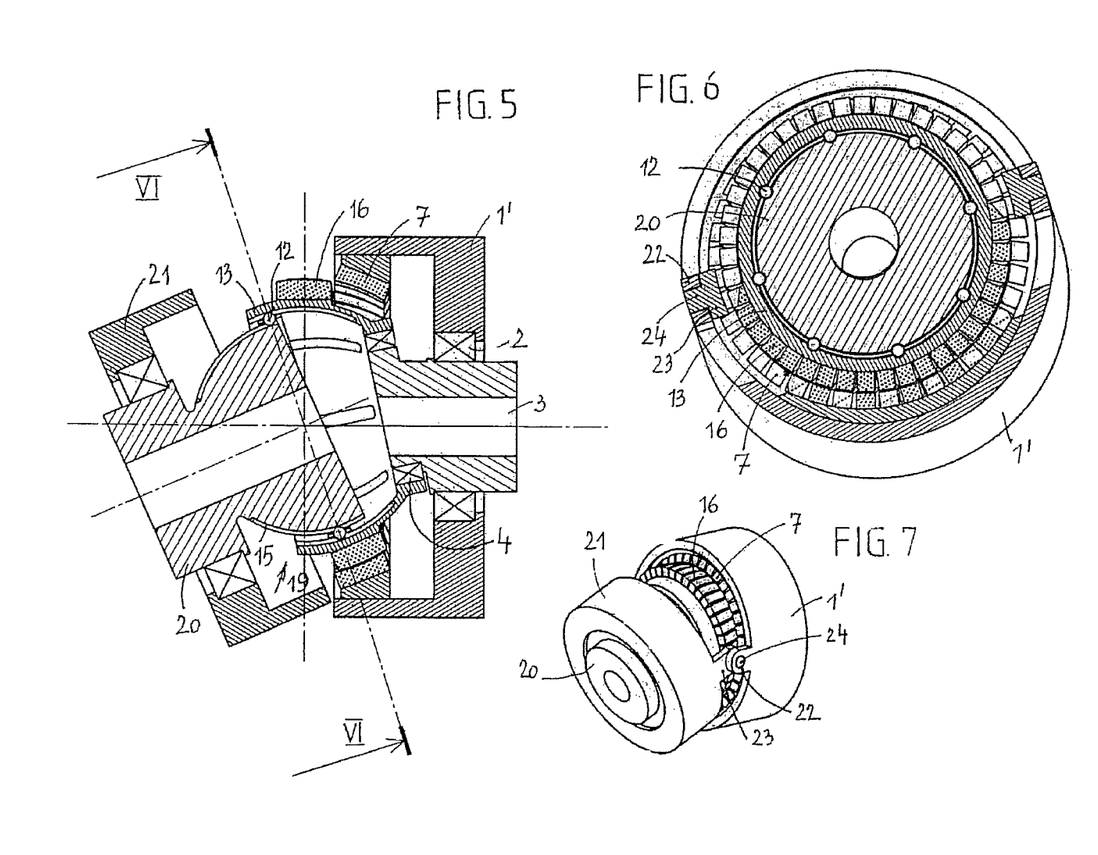
FIG. 5 shows a longitudinal section through a wobble mechanism according to the invention with a variable angle offset between the input shaft and the output shaft.
FIG. 6 shows a section along VI-VI in FIG. 5.
FIG. 7 shows a diagrammatic view of the wobble mechanism according to FIGS. 5 and 6.

In the exemplary embodiment according to FIGS. 5 to 7, the same designations are used for identical parts as in the description of the exemplary embodiment according to FIGS. 3 and 4.

The difference with respect to the above-described exemplary embodiment is that the output shaft 20 is mounted in a pivoting housing 21, it being possible for the pivoting housing 21 to be pivoted with respect to the housing 1'.

To this end, as can be seen from FIG. 7, the housing 1' is provided with two lobes 22 and the pivoting housing 21 is provided with two lobes 23, pivot pins 24 being plugged through the lobes 22, 23.

In general, said pivoting housing 21 can be arranged such that it can be pivoted at the same time about a further, second axis. A configuration of the joint as a ball joint is likewise conceivable, with the result that pivoting of the pivoting housing in two axial directions which are independent of one another is possible.

One area of use for said embodiment might be, for example, a front wheel drive for a passenger motor vehicle, in which the step-down gear mechanism is installed in the joint between the drive shaft and the front wheel. A further constant velocity joint would be dispensed with in this way because it is already present in the drive shaft train. However, use is also possible in other gear mechanisms, in which the output shaft is offset angularly with respect to the input shaft.

Numerous modifications are possible within the context of the invention. In particular, the configuration of the angle joints can be varied multiple times with respect to the joints which are described.

Figure 8:
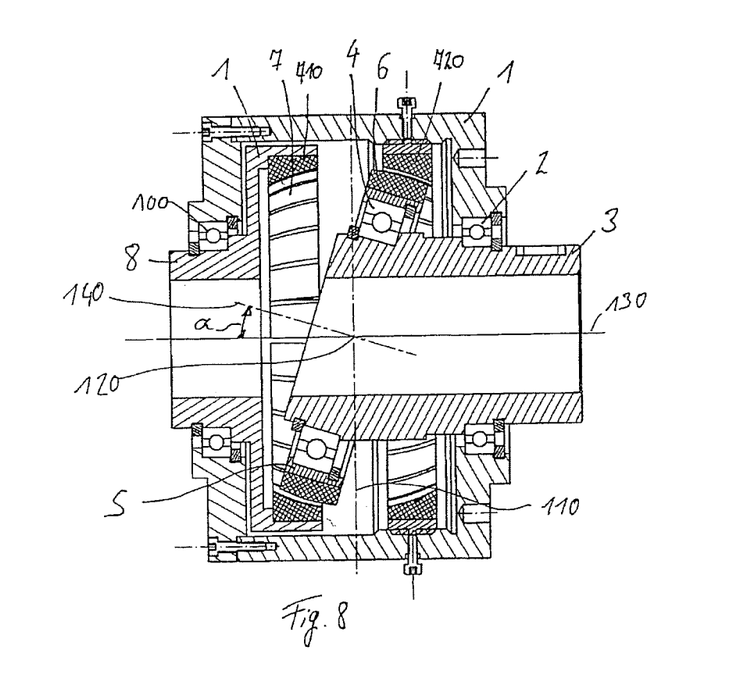
FIG. 8 shows a sectional illustration of a wobble mechanism.

FIG. 8 shows a wobble mechanism with a housing 1, in which a bearing 2 for mounting an input shaft 3 is arranged. FIG. 8 shows the wobble mechanism without an angle joint 9, 19 for reasons of clarity, but the comments with respect to the wobble mechanisms also apply in principle to wobble mechanisms with a connected angular gear mechanism 9, 19. The input shaft 3 is configured as a hollow shaft. A wobble body 5 is mounted rotatably on a bearing 4 on the input shaft 3 which rotates about a rotational axis 130. The wobble body 5 rotates about a wobble axis 140 which is tilted by an angle α with respect to the rotational axis 130 of the input shaft 3. During a rotation of the input shaft 3 about the rotational axis 130, a wobble movement of the wobble body 5 therefore takes place about a wobble point 120 which lies at the point of intersection of the rotational axis 130, the wobble axis 140 and a wobble plane 110. During a rotation of the input shaft 3 about the rotational axis 130, the wobble body 5 performs a wobbling movement if the input shaft 3 is rotated relative to the wobble body 5 or the housing 1.

Outer magnets 6 are arranged on the outer side of the wobble body 5, with alternating polarities in the circumferential direction in the exemplary embodiment which is shown. The outer contour of the outer magnets 6 is configured in such a way that it runs at an equal spacing from a spherical surface, that is to say forms a segment or a disk-like part of a spherical surface.

Two inner magnet regions 710, 720 which are fitted with inner magnets 7 are arranged in the housing. The inner magnets 7 are arranged circumferentially in the two inner magnet regions 710, 720, the latter being positioned on both sides of the wobble plane 110. The first inner magnet region 710 is arranged in a movably mounted part of the housing 1, and the second inner magnet region 720 is mounted in a stationary part of the housing 1. The movable part of the housing 1 is mounted on the stationary housing part of the housing 1 such that it can be moved via the bearing 100, and at the same time serves as an output shaft 8 which is likewise configured as a hollow shaft. Both inner magnet regions 710, 720 are arranged at an identical spacing from the wobble plane 110 in the housing 1, with the result that, in the case of a wobble movement, the outer magnets 6 of the wobble body 5 which in each case lie opposite one another interact in a manner diametrically opposite one another with inner magnets 7 of the respective inner magnet regions 710, 720. As a result of the symmetrical design, free moments in the wobble mechanism are reduced or avoided.

However, said arrangement of the inner magnet regions 710, 720 is not necessary.

The number of outer magnets 6 differs from the number of inner magnets 7 by at least one magnet, with the result that, in the case of a wobble movement, a relative movement takes place between the wobble body 5 and the housing 1 as a result of attracting and repelling forces between the inner magnets 7 and outer magnets 6, which leads to the output shaft 8 being rotated by one magnet in the case of a complete wobble movement, that is to say in the case of a complete revolution of the input shaft 3 in the case of a difference of one magnet of the inner magnets 7 from the outer magnets 6. A greater or smaller transmission ratio results depending on the number of magnets.

The entire wobble mechanism functions in a contactless manner, that is to say no friction occurs between the inner magnets and the outer magnets and the moment transmission takes place in a non-positive manner via the attracting and repelling forces of the magnets.

Figure 9:
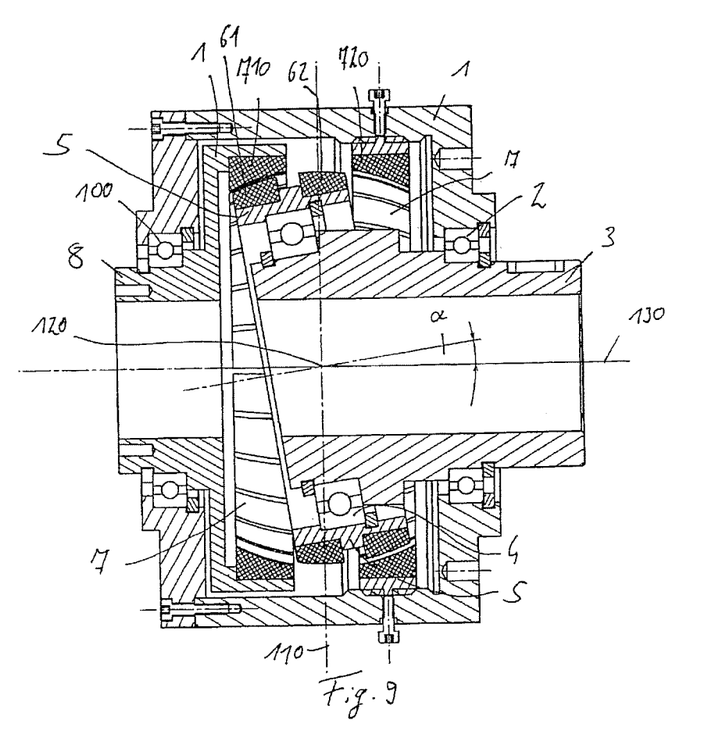
FIG. 9 shows a variant of FIG. 8.

FIG. 9 shows one variant, in which there is not only one row of outer magnets 6, but rather two regions 61, with outer magnets 6 which are arranged on the wobble body 5 and pivot predominantly on in each case one side of the wobble plane 110 during the wobble movement. As a result of the arrangement of two regions 61, 62 of outer magnets 6, it is possible to reduce the wobble angle α or, for example, to generate a particularly high gear mechanism step-down ratio.

Figure 10:
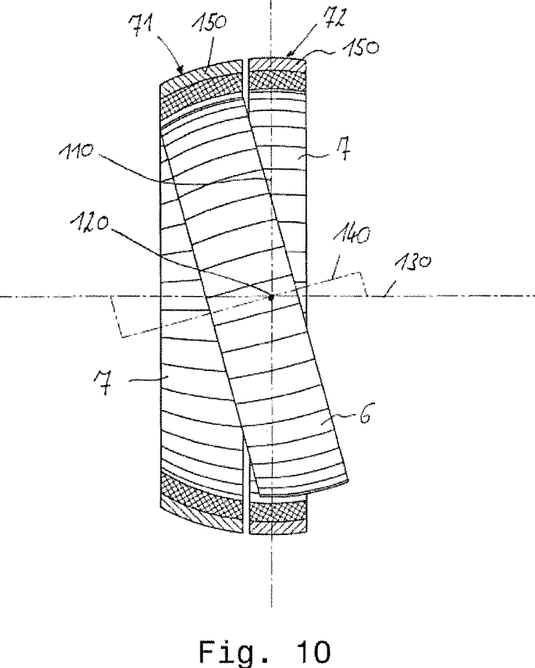
FIG. 10 shows a detailed illustration of a wobble mechanism.

In order to improve the degree of efficiency or the moment which can be transmitted of a wobble mechanism, in particular in order to increase the moment density, that is to say the ratio of the moment which can be transmitted to the weight of the wobble mechanism, it is provided that, instead of only one row of inner magnets 7, two ring rows 71, 72 of inner magnets which are arranged behind one another in the axial direction are arranged, as shown in FIG. 10. FIG. 10 shows a partial sectional illustration of the installation position according to FIG. 8 with only one inner magnet region. The remaining components of the wobble mechanism are not shown, but correspond substantially to the embodiment according to FIG. 8; the wobble mechanism would also function with only one inner magnet region 710.

FIG. 10 shows the embodiment according to the invention, in which inner magnets 7 are arranged circumferentially in two ring rows 71, 72 which are arranged behind one another. Behind one another means here behind one another as viewed in the axial direction with regard to the rotational axis 130. The first ring row 71 has a number of inner magnets 7 which are received in a receptacle which also at the same time forms a magnetic circuit 150. The receptacle can be formed from plastic or metal, and the individual magnets 7 can be adhesively bonded, welded or clamped therein. The inner magnets 7 are advantageously arranged in an alternating manner with an alternating polarity, but it is also possible in principle to provide different orientations. A second ring row 72 with inner magnets 7 is arranged axially in front of the first ring row 71, which inner magnets 7 are likewise coupled magnetically to one another via a circuit 150 which is arranged on the outside, with the result that there is radial magnetization. The number of inner magnets of the first ring row 71 and of the second ring row 72 is identical, but the second ring row 72 is rotated relative to the first ring row 71, with the result that a moment transmission is also possible to the movable part of the housing and therefore to the output shaft for that part of the outer magnets 6 which are situated axially outside the first ring row 71 on account of the wobble movement. In the exemplary embodiment which is shown, they are situated in the region of the lower half of the wobble body.

On account of the rotation of the first ring row 71 relative to the second ring row 72, it is possible that the lower part of the wobble body 5 with the outer magnets 6 which are arranged thereon and could no longer contribute to the transmission of force in the exemplary embodiment according to FIG. 8 also comes into interaction with the inner magnets 7 of the second ring row 72, no moments which act counter to one another occurring on account of the rotation, as a result of which higher moments can be transmitted overall with a virtually identical amount of installation space.

The outer contour of the outer magnets 6 is advantageously spherical, with a center point which corresponds to the wobble point 12. It is possible as a result that a constant, minimum air gap can be achieved between the outer magnets 6 and the inner magnets in the case of corresponding shaping with respect to the inner contour of the inner magnets 7.

In the exemplary embodiment which is shown, the second ring row 72 is narrower than the first ring row 71, and the second ring row 72 can be at least wide enough that the outer magnets 6 which protrude beyond the first ring row 71 during a wobble movement are covered for the greatest part; ideally, they are covered completely. The outer magnets 6 would not have to be pivoted completely out of the first ring row 7.

Figure 11:
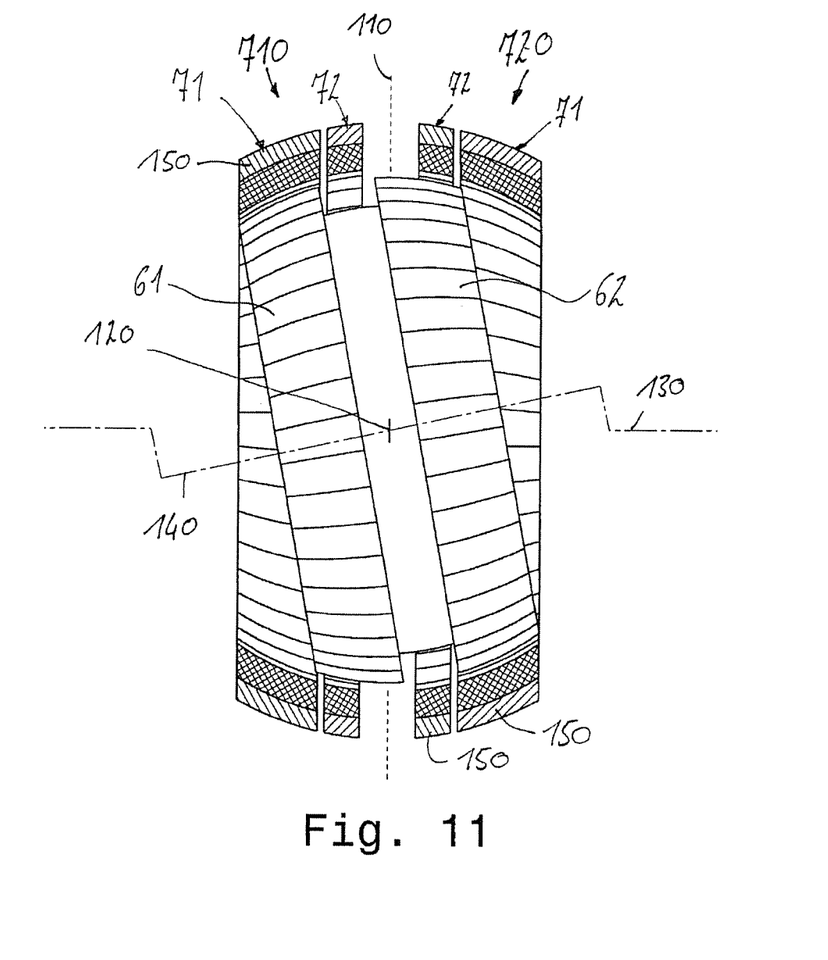
FIG. 11 shows a variant of FIG. 10.

FIG. 11 shows one variant of the invention, in which, in an analogous manner to the embodiment according to FIG. 9, two inner segment regions 710, 720 are arranged with in each case a first ring row 71 and a second ring row 72. Two regions 61, 62 with outer magnets 6 are provided on the wobble body, of which regions 61, 62 the first region 61 interacts only with the first inner segment region 710, whereas the second region 62 of the outer magnets 6 interacts only with the second inner magnet region 720. In each case two ring rows 71, 72 with in each case the same number of magnets are also provided here for each inner magnet region 710, 720, the respective second ring row 72 being arranged offset by one magnet or by one magnet pole with respect to the respective first ring row 71. By way of the embodiment according to FIG. 4, the maximum moment which can be transmitted is raised, and a higher moment density and a greater rigidity of the wobble mechanism likewise arise.

Figures 12A, 12B, 13:
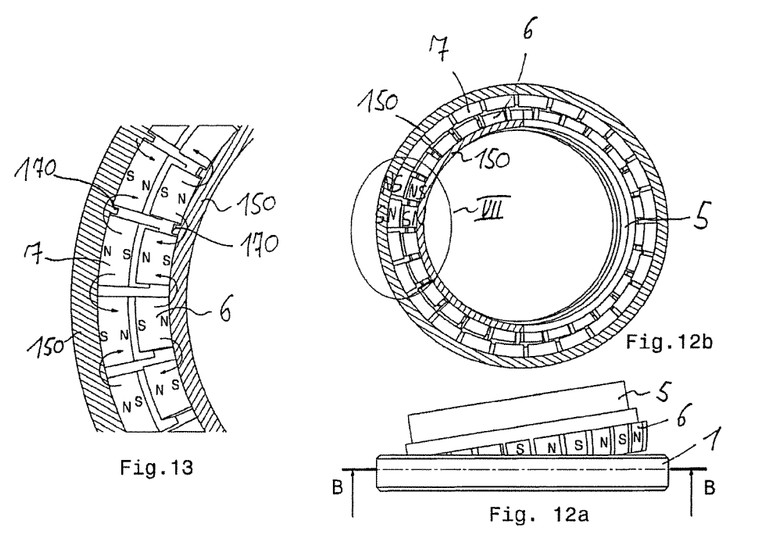
FIG. 12a shows a side view of a wobble body.
FIG. 12b shows a plan view of a wobble body in a housing.
FIG. 13 shows a detailed view of FIG. 12b.

FIG. 12a shows a side view of the wobble body 5 with the outer magnets 6 in an installed state, the wobble body 5 interacting only partially with the inner magnets which are arranged within the housing 1. The second ring row of inner magnets is not shown, in order to indicate the assignment of the components during the wobble movement.

FIG. 12b shows a plan view of a wobble body 5 with outer magnets 6 which are arranged thereon, which wobble body 5 is arranged in a housing, for example the movable housing part which forms the output shaft 8. The inner magnets 7 are arranged in the housing, which inner magnets 7 are coupled to one another via a magnetic circuit 150. The outer magnets 6 of the wobble body 5 are likewise coupled magnetically to one another via an inner magnetic circuit 150. It can be seen in FIG. 12b that the inner magnets 7 are arranged circumferentially with alternating polarity, and the outer magnets 6 are likewise arranged on the wobble body 5 with alternating magnet polarity. It can be gathered from FIG. 12b that there are 24 inner magnets 7 and 26 outer magnets 6, the outer magnets 6 and the inner magnets 7 being moved in an offset manner with respect to one another as a result of the wobble movement of the wobble body 5, with the result that attracting and repelling forces act partially, which leads to the inner magnets 7 being rotated relative to the outer magnets 6, without mechanical contact taking place between the force-transmitting components.

FIG. 13 shows a detailed view of the arrangement of the magnets 6, 7 in the region of the respective magnetic circuit 150. The inner magnets 7 are fixed, for example adhesively bonded fixedly, with alternating polarity on the outer magnetic circuit 150, projections being arranged between the individual inner magnets 7 or the magnets 7 being embedded into grooves, in order to achieve improved positionability of the respective magnets 7 during assembly. The webs 170 facilitate the insertion of the magnets 6, 7 into the grooves which are formed between the webs 170. This results in greater mechanical stability. An adhesive can be arranged between the individual magnets 6, 7, in order to encapsulate the magnets 6, 7 and to achieve greater mechanical stability.

The magnetic circuit 150 can be configured in one piece in each case; as an alternative to this, a division of the magnetic circuit can take place parallel to the wobble plane 110, with the result that there is likewise a rotatability of the first ring row 71 relative to the second ring row 72, as well as axial displaceability. A spherical configuration of at least the inner contour of the inner magnets 7 and the outer contour of the outer magnets 6 is advantageous.

Figures 14, 15A, 15B:
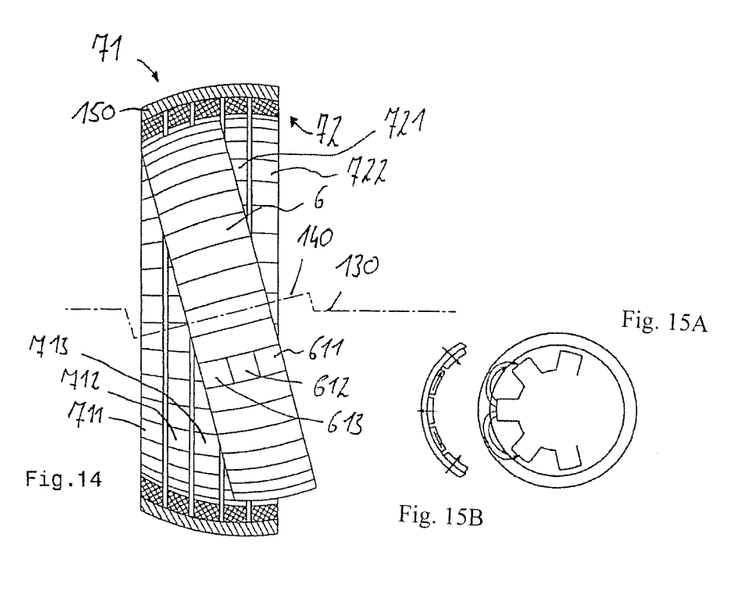

FIG. 14 shows a further variant of the invention; the basic construction corresponds to that of FIG. 10. Instead of providing only single-piece inner magnets 7, the inner magnets 7 are segmented in the exemplary embodiment which is shown, and the first ring row 71 has three magnet segments 711, 712, 713 which are arranged behind one another, have in each case the same magnet polarity and are arranged behind one another in the axial direction. The second ring row 72 has two magnet segments 721, 722 which likewise have the same polarity. The number of magnet poles of the two ring rows 71, 72 is identical, and the segments 721, 722 of the second ring row 72 are arranged rotated by one magnet with respect to the segments 711, 712, 713 of the first ring row 71. The outer magnets 6 can also be of segmented configuration, and the outer magnet segments 611, 612, 613 are indicated in FIG. 14.

As a result of the segmentation, facilitated shaping of the inner contour and outer contour of the inner magnet regions 710, 720 and the outer magnets 6 can be achieved; instead of a continuous and virtually spherical embodiment, a polygonal shape can be produced which is approximated to the spherical shape, with the result that, although there are inhomogeneities in the air gap between the inner magnets 7 and the outer magnets 6, said inhomogeneities can be economically justifiable as a result of the reduced outlay on the production of the respective magnet segments. Magnet segments can also be configured as cylindrical segments which can optionally also be used in combination with magnet elements of different design or exclusively.

As a result of the segmented configuration of the inner magnets 7 or outer magnets 6, the different thermal expansion of the magnets in comparison with the magnetic circuit 150 is compensated for, and segmentation reduces the absolute length extension on account of the shortened individual segments.

The greater the wobble angle $\alpha$, the greater the torques which can be transmitted. In addition to a configuration of the outer magnets 6 and the inner magnets 7 as individual magnets, it is also possible to achieve the radial magnetization by way of a magnet ring, as shown in the right-hand illustration in FIG. 15A. It is likewise possible to arrange the magnets in the context of a Halbach array, as shown in the left-hand illustration in FIG. 15B.

Figure 16:
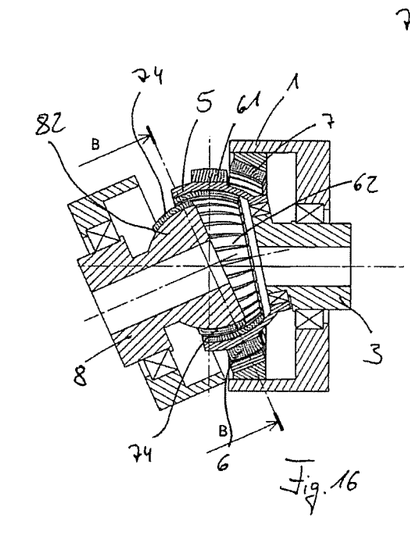
FIGS. 16 and 17 show illustrations of one variant of FIG. 11.

FIG. 16 shows a further embodiment of the wobble mechanism, in which the angle joint is a magnetic coupling. The input shaft 3 is mounted in the housing 1, which input shaft 3 supports the wobble body 5, on which outer magnets 6 are situated. The latter interact with magnets 7 which are arranged in the housing 1 in the way which has already been described.

Unlike the exemplary embodiment which is shown in FIG. 11, the wobble body 5 is configured as a hollow body in the exemplary embodiment which is shown in FIG. 16. Whereas the magnets 6 on the outer side form the first region 61, the second region 62 comprising magnets is arranged on the inner side of the wobble body 5 of hollow configuration, which magnets interact with magnets 74 which are arranged on the outer side of an element 82 which is spherical in the exemplary embodiment shown and is part of the output shaft 8. As in the example which is shown in FIG. 11, the torque is also transmitted in this exemplary embodiment from the input shaft 3 to the wobble body 5 and from the latter via the magnetic coupling of the magnets 62 and 74 to the output shaft 8.

Figure 17:
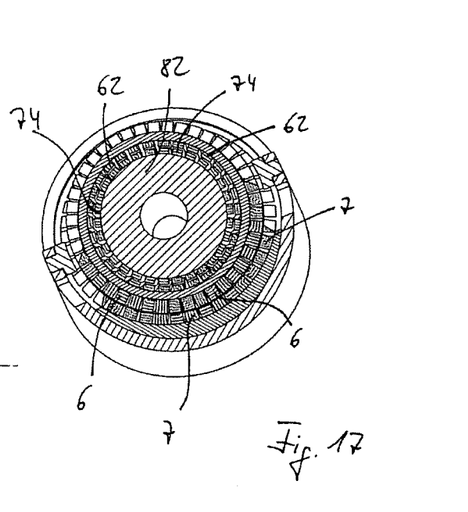

FIG. 17 shows the sectional illustration along the line B-B from FIG. 16. It can be seen that the magnets 6 and 61 interact with the magnets 7, whereas the magnets 74 which are fastened to the component 82 interact with the magnets 62 on the inner side of the wobble body 5. In the present case, both the magnetic coupling which is shown in FIG. 11 and the magnetic coupling which is shown in FIGS. 16 and 17 are included by an angle joint. Said coupling functions particularly satisfactorily if the magnets 62 and 74 are present in the same number, as shown in the figures. In this case, particularly satisfactory coupling of the wobble body 5 to the output shaft 8 takes place.

The invention claimed is:

1. A wobble mechanism having
   an input shaft;
   an output shaft;
   a wobble body arranged on the input shaft, wherein the wobble body is connected to the output shaft via an angle joint;
   outer magnets arranged on the outer side of the wobble body;
   a housing; and
   inner magnets which interact with the outer magnets and are arranged in the housing in order to transmit the torque to the output shaft,
   wherein the housing surrounds the wobble body at least partially, the inner magnets which interact with the outer magnets are arranged on the inner side of the housing, the number of outer magnets differs from the number of inner magnets, there being a radial magnetization, and the inner magnets are arranged in two ring rows which are arranged behind one another with a first ring row and a second ring row which are rotated with respect to one another,
   wherein two regions are arranged on the wobble body which are arranged behind one another in the axial direction of the input shaft, are separate from one another, have outer magnets and interact in each case with two inner magnet regions which are separate from one another.

2. The wobble mechanism according to claim 1, wherein the angle joint is a cardan joint or a magnetic coupling.

3. The wobble mechanism according to claim 1, wherein the angle joint is a constant velocity joint.

4. The wobble mechanism according to claim 1, wherein the output shaft can be pivoted with respect to the housing which is provided with the magnets.

5. The wobble mechanism according to claim 4, wherein the output shaft is mounted in a pivoting housing which can be pivoted with respect to the housing which is provided with the magnets.

6. The wobble mechanism according to claim 1, wherein the two ring rows have the same number of inner magnets, and the first ring row is rotated by one magnet with respect to the second ring row.

7. The wobble mechanism according to claim 1, wherein the outer magnets have a domed outer contour.

8. The wobble mechanism according to claim 1, wherein the inner magnets have a domed inner contour.

9. The wobble mechanism according to claim 1, wherein the outer magnets or inner magnets or both outer magnets and inner magnets are segmented in the axial extent.

10. The wobble mechanism according to claim 1, wherein the outer magnets are mounted rotatably in the housing on an output shaft.

11. The wobble mechanism according to claim 1, wherein the magnets are mounted in a positively locking manner in the wobble body and the housing.

12. The wobble mechanism according to claim 1, wherein the magnets are arranged with alternating polarities on the wobble body and in the housing.

13. The wobble mechanism according to claim 1, wherein the magnets are configured as individual magnets or as a multi-pole radially magnetized ring magnet.

14. The wobble mechanism according to claim 1, wherein the magnets are arranged or configured in a Halbach array.

15. A wobble mechanism having
   an input shaft;
   an output shaft;
   a wobble body arranged on the input shaft, wherein the wobble body is connected to the output shaft via an angle joint;
   outer magnets arranged on the outer side of the wobble body;
   a housing; and
   inner magnets which interact with the outer magnets and are arranged in the housing in order to transmit the torque to the output shaft,
   wherein the housing surrounds the wobble body at least partially, the inner magnets which interact with the outer magnets are arranged on the inner side of the housing, the number of outer magnets differs from the number of inner magnets, there being a radial magnetization, and the inner magnets are arranged in two ring rows which are arranged behind one another with a first ring row and a second ring row which are rotated with respect to one another,
   wherein the second ring row is of narrower configuration than the first ring row.

* * * * *